(No Model.)
P. W. MACKENZIE.
PROCESS OF MANUFACTURING ILLUMINATING GAS.
No. 246,965. Patented Sept. 13, 1881.
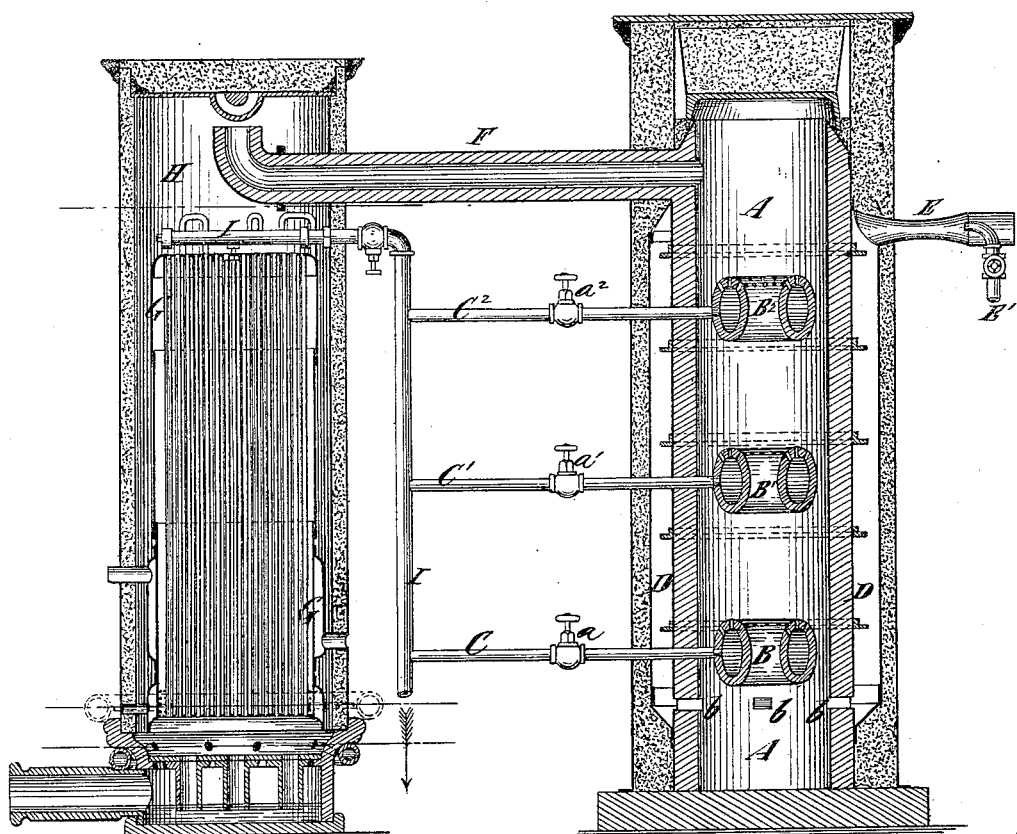

UNITED STATES PATENT OFFICE.

PHILIP W. MACKENZIE, OF BLAUVELTVILLE, ASSIGNOR TO THE MACKENZIE & SAYRE MANUFACTURING COMPANY, OF NEW YORK, N. Y.

PROCESS OF MANUFACTURING ILLUMINATING-GAS.

SPECIFICATION forming part of Letters Patent No. 246,965, dated September 13, 1881.

Application filed October 5, 1880. (No model.)

*To all whom it may concern:*

Be it known that I, PHILIP W. MACKENZIE, of Blauveltville, in the county of Rockland and State of New York, have invented a certain new and Improved Process of Manufacturing Illuminating-Gas, of which the following is a description.

My invention relates to the manufacture of gas for illuminating and other purposes by first generating in a suitable furnace or generator a lean gas—such as a mixture of carbonic oxide and hydrogen—and afterward enriching such gas to the degree desired by the addition to it, while hot, and the incorporation therewith of a gas richer in carbon.

The object of my invention is to dispense entirely with the use of solid fuel—such as coal, coke, &c.—in such manufacture; and to this end it consists in a process, hereinafter described, in which the lean gas is obtained by combustion of a gas or vapor, and in which different portions of the same liquid hydrocarbon may be used, one portion for the combustion to produce the lean gas, and the other portion for the production of the vapor or gas with which the lean gas is to be enriched.

Apparatus of various constructions may be employed in carrying out my process; but a very desirable form of apparatus is shown in the accompanying drawing, which represents a central vertical section of such apparatus.

A designates a furnace or generator, within which are arranged two or more hollow perforated burners or distributers, B B' B², arranged one above another, and preferably of annular form, so as to expose as large an area of exterior surface as possible. These burners or distributers are supplied with hydrocarbon vapors by means of pipes C C' C², furnished with suitable valves, $a$ $a'$ $a^2$.

The furnace or generator is surrounded by a jacket, D, in which air or oxygen and steam, supplied by an injector composed of an air-nozzle, E E', are heated, and from which the heated mixture of air or oxygen and steam escapes, through pipes or tuyeres $b$, into the furnace or generator below the lowest burner or distributer, B.

F designates a pipe through which the perfected permanent gas may escape.

In the operation of my apparatus hydrocarbon in a state of gas or vapor is admitted to the lower burner, B, and a quantity of steam and oxygen or air necessary to support combustion is forced into the jacket D, and thence, passing downward, is heated, and enters the generator through the pipes or tuyeres below the burner B, and, mixing with the hydrocarbon vapor issuing therefrom, produces a combustible mixture, which, upon being ignited, produces a mixture of carbonic oxide and hydrogen which heats the distributer B'. If, now, the hydrocarbon vapor be supplied in proper quantity to the distributer B', it is heated to such a degree that decomposition or destructive distillation takes place, and the atoms of hydrocarbon, uniting with the mixture of carbonic oxide and hydrogen, which forms a diluent therefor, converts it into a perfected permanent illuminating-gas.

If a very rich gas is desired a still further quantity of hydrocarbon vapor is introduced into the upper distributer, B², and is by the heat decomposed and combined with the gas to make a permanent and perfected gas of great richness, which passes off through the pipe F.

Although the hydrocarbon vapors may be derived from any suitable source, I preferably employ a multitubular evaporator and converter, G, arranged in a chamber, H, into which the pipe F delivers the gas above the evaporator and converter G.

I designates a pipe leading from the evaporator and converter, and supplying hydrocarbon vapor to the several pipes, C C' C².

The evaporator and converter is smaller than the chamber H, thus forming an annular passage down around the same, and the permanent or perfected gas, passing downward around the evaporator and converter, and through the tubes thereof, heats the hydrocarbon liquid contained therein sufficiently to vaporize it, and heats the vapor to a high temperature, and at the same time is itself cooled. The gas then passes off through the hydraulic main J for further treatment.

The novel features of construction embodied in the generator and in the evaporator and converter form no part of my present invention, but are the subjects of other applications for Letters Patent and are not claimed herein.

What I claim as my invention, and desire to secure by Letters Patent, is—

The process of producing a gas suitable for illuminating or other purposes, consisting in first mixing hydrocarbon in a state of gas or vapor with steam and oxygen or air and subjecting them to a sufficient heat to effect their combustion and decomposition, and adding to the products of such combustion while hot a sufficient quantity of hydrocarbon in a state of gas or vapor to be decomposed by the heat of said products, and combined therewith in the form of a perfected permanent gas, substantially as specified.

P. W. MACKENZIE.

Witnesses:
HENRY T. BROWN,
T. J. KEANE.